Dec. 5, 1967  L. W. JOHNSON  3,356,214
ROTARY SCREENING DEVICE
Filed June 8, 1964  5 Sheets-Sheet 1

LOUIS W. JOHNSON
INVENTOR.
BY
BUCKHORN, BLORE, KLARQUIST & SPARKMAN
ATTORNEYS

Dec. 5, 1967 L. W. JOHNSON 3,356,214
ROTARY SCREENING DEVICE
Filed June 8, 1964 5 Sheets-Sheet 5

LOUIS W. JOHNSON
INVENTOR.
BY
BUCKHORN, BLORE, KLARQUIST & SPARKMAN
ATTORNEYS

United States Patent Office 3,356,214
Patented Dec. 5, 1967

3,356,214
ROTARY SCREENING DEVICE
Louis W. Johnson, 3440 Franklin Blvd.,
Eugene, Oreg. 97403
Filed June 8, 1964, Ser. No. 373,160
12 Claims. (Cl. 209—309)

This invention relates to a rotary screening device, and more particularly to a rotary screening device having a vibration free base frame.

It would be desirable to provide a rotary screening device in which a base frame thereof is free of vibrations imparted to screens thereof. It would also be desirable to provide such a screening device with less complex and less expensive crank structures for revolving the screens than present in the prior art rotary screening devices. It would also be desirable to provide improved suspension of the screens of a rotary screening device, and to provide such a device with a feeder for uniformly feeding material to screens thereof.

An object of the invention is to provide a new and improved rotary screening device.

Another object of the invention is to provide a rotary screening device having a vibration free base frame.

A further object of the invention is to provide a rotary screening device having screens supported by a base frame and driven with no vibration transmitting connections between the screens and the base frame.

Yet another object of the invention is to provide a rotary screening device having a simple, inexpensive crank structure for revolving screens thereof.

Still another object of the invention is to provide a rotary screening device having improved suspension of the screens.

A still further object of the invention is to provide a rotary screening device having a surge tank and a feeder mounted on a base frame also supporting screens of the device.

A complete understanding of the invention may be obtained from the following detailed description of a rotary screening device forming a specific embodiment of the invention, when read in conjunction with the appended drawings, in which.

Figure 1:
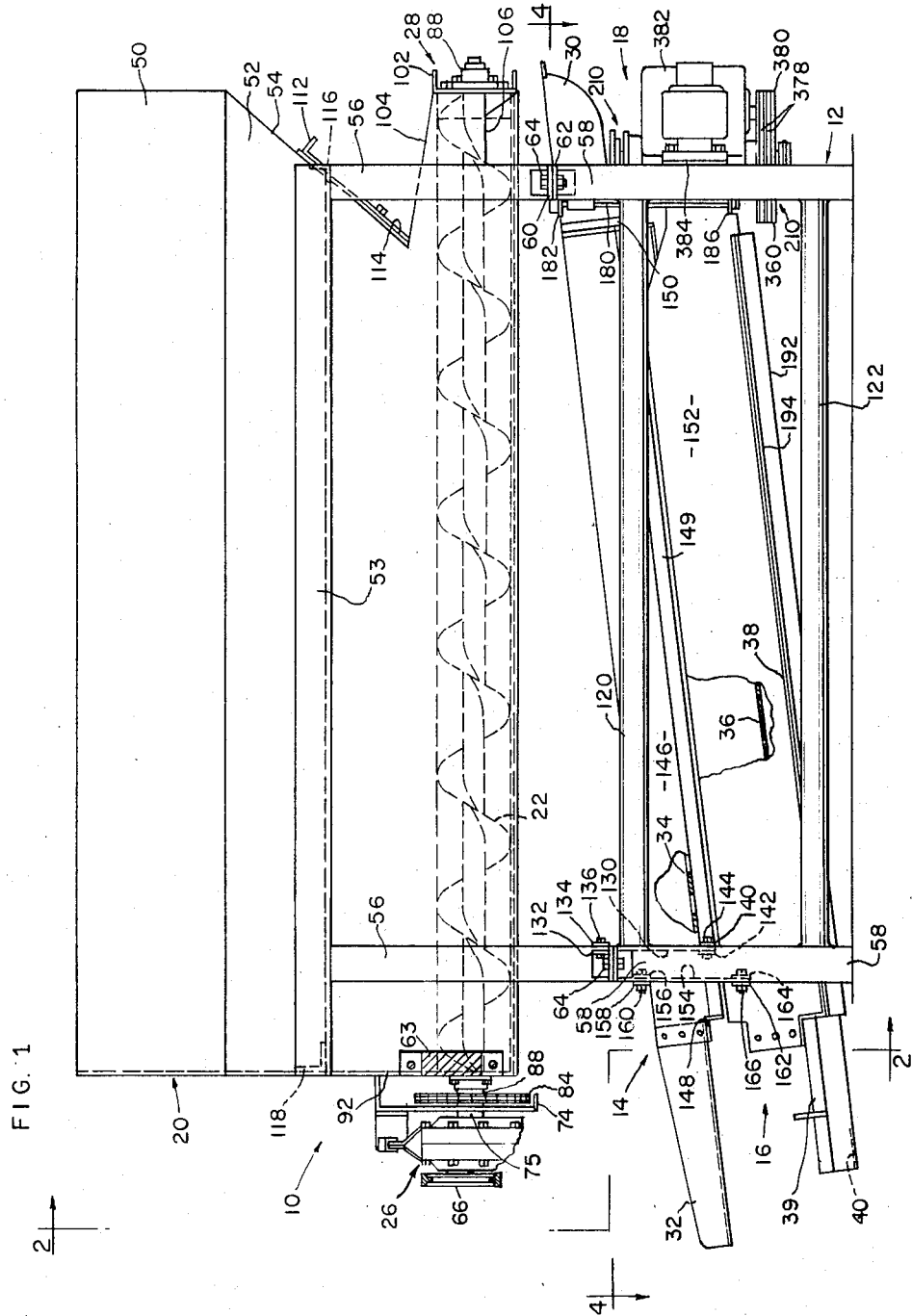
FIG. 1 is a side elevation view of a rotary screening device forming one embodiment of the invention.

Referring now in detail to the drawings, there is shown therein a rotary feeding device 10 including a base frame 12 which supports for individual floating movement an upper screen 14 and a lower screen 16 positioned therebelow, which are given a gyratory or revolving motion by a drive 18. The base frame 12 also supports as an integral part of the rotary screening device 10 a surge tank or hopper 20 having in the bottom thereof a pair of helical conveyor screws 22 and 24 driven by a drive 26 to feed material to be screened such as, for example, wood chips, out of a discharge end 28 thereof into a receiving portion 30 of the upper screen 14. The oversized portions or "overs" are discharged at the lower end of the screen 14 from an extended discharge chute 32, fines and acceptable sized particles are dropped through a screen bed 34 of the screen 14 onto a screen bed 36 of the lower screen 16, and the fines are dropped from the screen bed 36 onto an imperforate bottom chute portion 38 of the screen 16 positioned below the bed 36 of the screen 16. The chips or particles of acceptable size are discharged from the lower end of the screen 16 to oppositely sloping, transverse chutes 39 positioned under the discharge chute 32, and the fines are discharged from a tubular chute 40 positioned under the chutes 39, the oversized particles and the fines being discharged into separate conveyor elements or receptacles (not shown) as is well known in the art.

Figure 2:
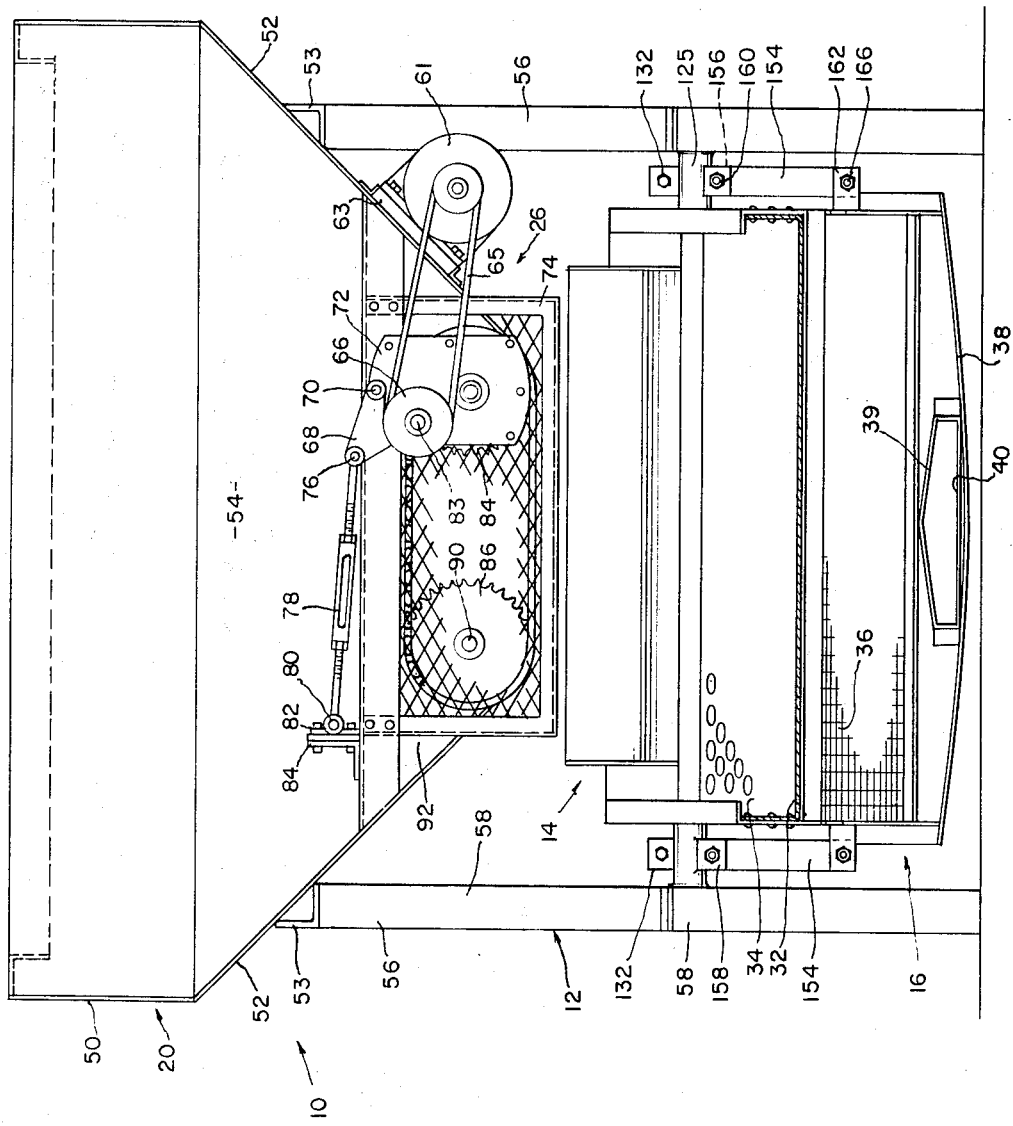
FIGS. 2 and 3 are views of opposite ends of the rotary screening device of FIG. 1.
Figure 3:
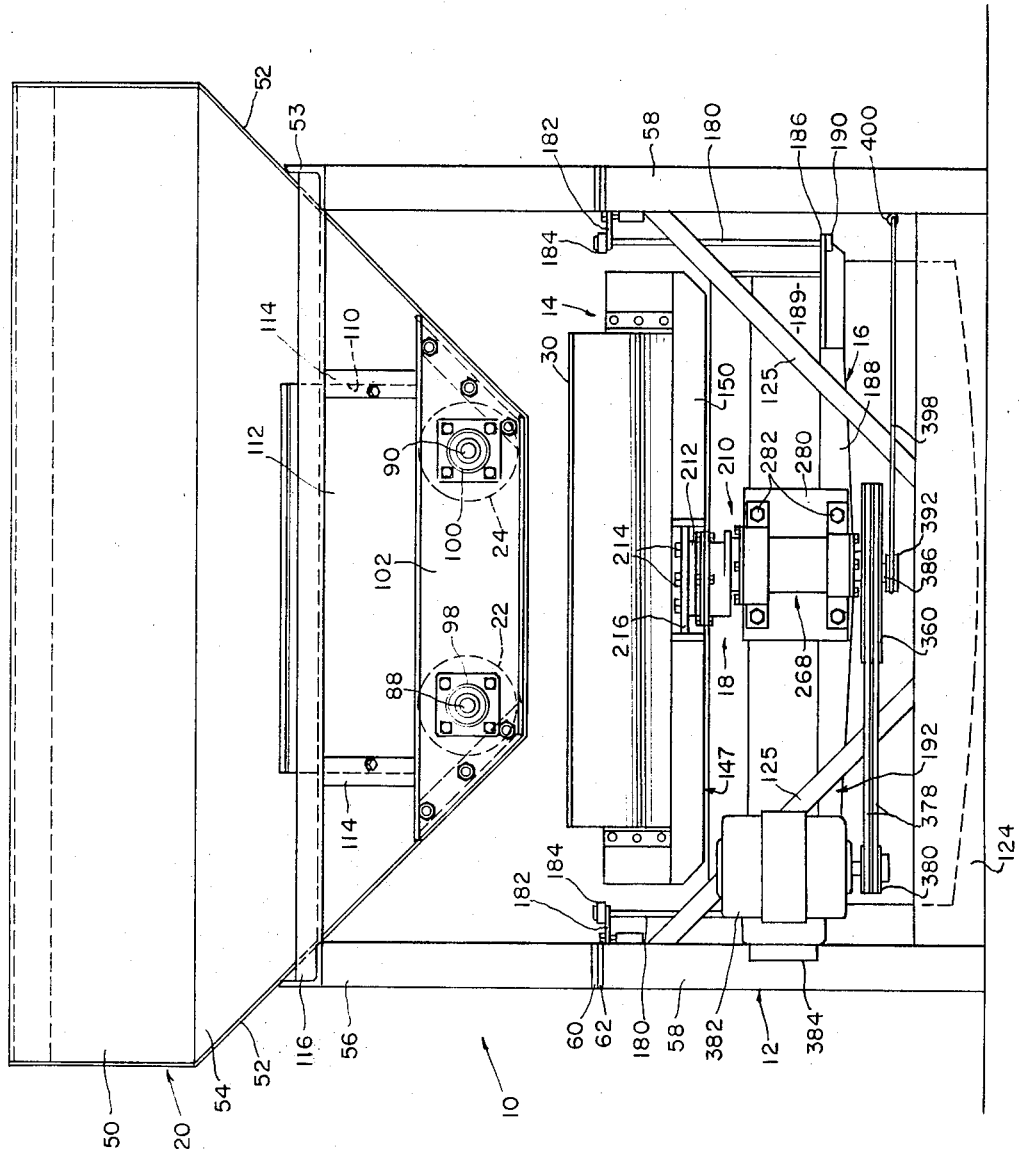

The surge tank 20 includes a rectangular upper portion 50, and inclined lower walls 52 and 54. The walls 52 are supported by and are suitably secured to horizontal angle members 53 (FIG. 2) supported by four upper posts 56 fastened detachably to lower posts 58 of the base frame 12 by brackets 60 and 62 and bolts 64. The drive unit 26 includes an electric motor 61 mounted by a bracket 63 on the righthand one of the inclined lower sides 52, as viewed in FIG. 2, and driving through belts 65 a pulley 66 carried by mounting member 68 fixed rigidly to a gear box 72 by bolts, of which a bolt 70 is shown. The gear box is pivotally mounted on its output shaft 75, and is mounted outside of a frame 74. The gear box is connected by pin 76 to a turnbuckle 78 connected at its other end by a pin 80 and a pillow block 82 fixed rigidly to mounting bracket 84 fixed to the surge tank 20. The pulley 66 drives input shaft 83 of the gear box 72 to drive the gearing of the gear box, and the output of the gear box drives sprockets 84 and 86 keyed to shafts 88 and 90 of the helical conveyor screws 22 and 24, respectively, the shafts 88 and 90 being journaled in a heavy plate 92 forming a portion of the end wall of the surge tank 20. The other ends of the shafts 88 and 90 are journaled in bearings 98 and 100 (FIG. 3), respectively. The bearings 98 and 100 are carried by a channel 102 secured to projecting portion 104 of the surge tank 20. Openings 106 (FIG. 1) in the projecting portion 104 are provided for discharging the wood chips from the surge tank 20 to the receiving portion 30 of the screen 14. The surge tank 20 has an opening 110 in the wall 54 thereof which normally is closed by lift gate 112 slidable in parallel guides 114 supported by cross angle member 116 carried by the posts 56. A second angle member 118 (FIG. 1) is secured to the angle members 53 at the lefthand ends thereof to form a rigid frame with the angle members 53 and 116.

Figure 4:
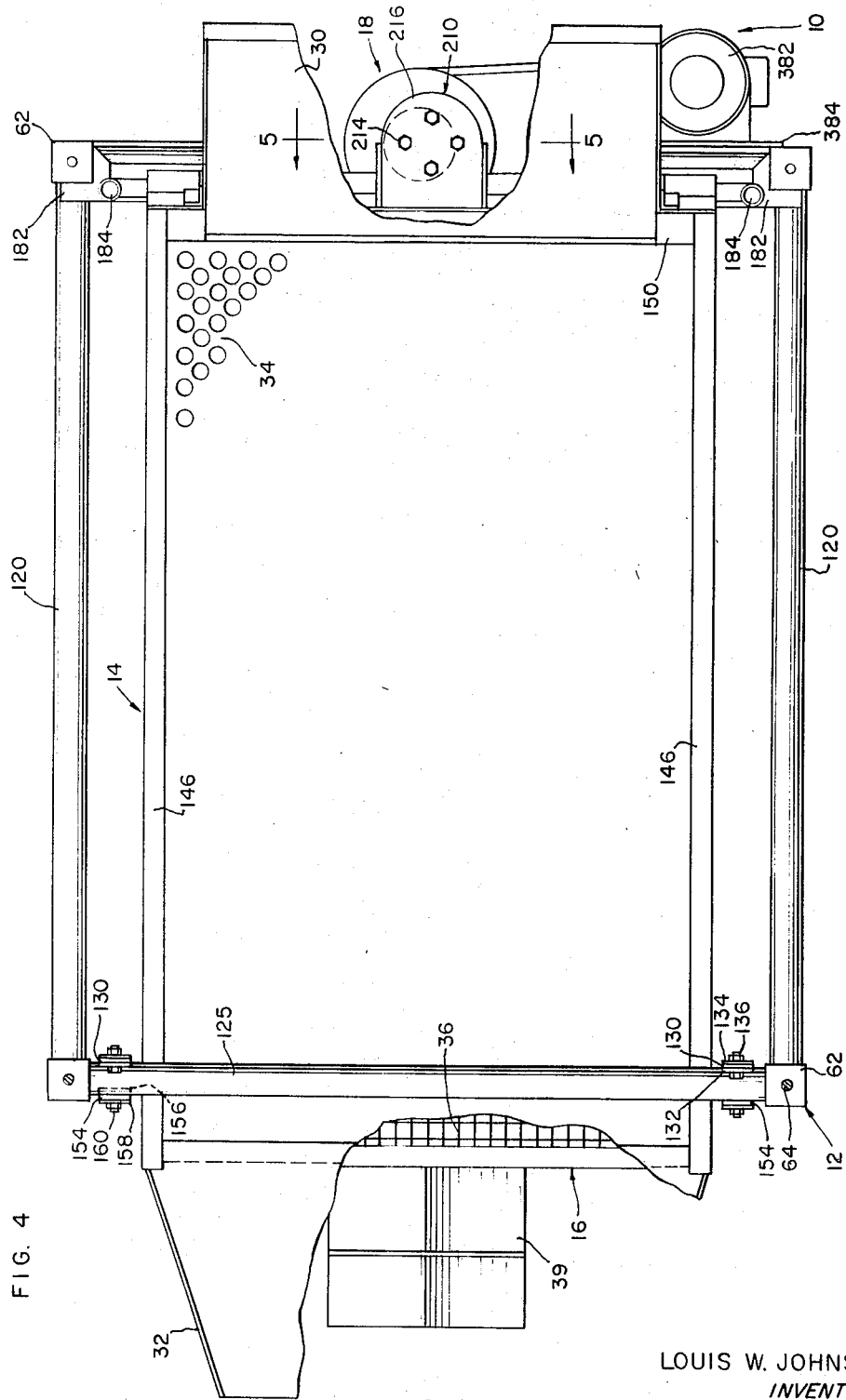
FIG. 4 is a top plan view, with portions thereof broken away, of the rotary screening device of FIG. 1.

As illustrated in FIGS. 1 and 4, the base frame 12 includes longitudinal, rigid, tubular members 120 and 122 rigidly secured to the posts 58 and also includes rigid cross members 124 and 125 (FIG. 3) at the ends of the rotary screening device 10 to form a rigid frame. A pair of spring steel straps 130 (FIGS. 1 and 4) are secured between brackets 132 and clamping plates 134 by bolts 136 to the cross member 125 of the base frame 12 at their upper ends. The straps 130 are secured at their lower ends by brackets 140, clamping plates 142 and bolts 144 to the lefthand end of the upper screen 14, the brackets 140 being secured to sides 146 of the screen 14. The sides 146 are carried by a rigid frame 147 including members 148, 149 and 150. The frame 147 carries the screen bottom 34. Similarly, rigid side members 152 of the lower screen 16 are supported by spring steel straps 154 fixed by brackets 156, clamping plates 158 and bolts 160 to the cross member 125, at their upper ends in positions lying in the same plane. The straps 154 are fixed at their lower ends by brackets 162, clamping plates 164 and bolts 166. Both the straps 130 lie in a single plane and suspend the lefthand end of the inclined screen 14 from the base frame 12 for substantially free longitudinal movement relative to the frame 12, while substantially preventing transverse movement of the elongated screen 14 relative to the base frame 12. The straps 130, however, will permit limited twisting movement about a vertical axis relative to the frame 12. The straps 154 permit similar movement of the inclined screen 16 relative to the base frame 12 and independently of the movement of the screen 14. Thus, the lefthand ends of the screens 14 and 16, as viewed in FIG. 1, are mounted for longitudinally, substantially reciprocal movement relative to the base frame 12, and, in effect, permit pivoting of the screens 14 and 16 about the lefthand ends thereof relative to the base frame 12, but are substantially prevented from transverse horizontal movement relative to the base frame 12.

The upper, highthand end of the screen 16, as viewed in FIG. 1, is suspended from the base frame 12 for rotary, generally horizontal movement relative to the base frame by a pair of flexible strands or cables 180. The cables are substantially circular in transverse cross section and flex easily in all directions transverse to the longitudinal axes thereof. The upper ends of the cables are secured to brackets 182 (FIGS. 1 and 3) fixed to the posts 58 and have knobs 184 fixed thereto. The lower ends of the cables are fixed to brackets 186 rigid with a cross member 188 forming a part of rigid frame 192 of the lower screen 16. Knobs 190 are secured to the lower ends of the cables 180. The frame 192 also includes longitudinal members 194 (FIG. 1) and cross member 189.

Figure 5:
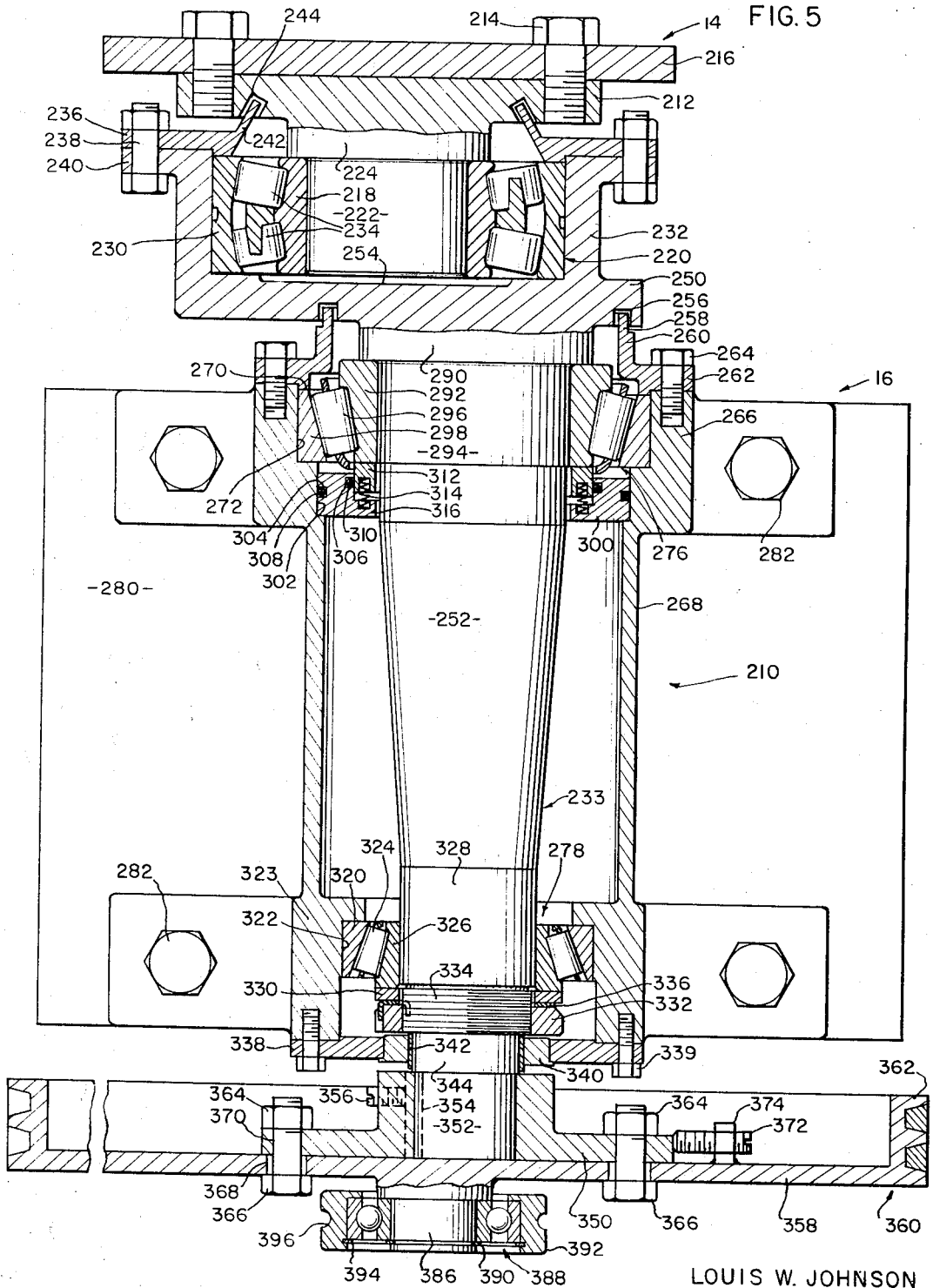
FIG. 5 is an enlarged, fragmentary vertical sectional view taken substantially along line 5—5 of FIG. 4.

The cross member 150 (FIG. 3) forms a part of the rigid frame 147 of the upper screen 14 along with longitudinal members 146 and 149 (FIG. 1) and cross member 148. The righthand end of the upper screen is supported solely by the righthand end of the lower screen 16 through a crank mechanism 210 (FIGS. 1, 3 and 5), and is free to move relative to the base frame 12 and the lower screen except as limited by the crank mechanism. The crank mechanism includes a rigid base plate 212 secured by capscrews 214 to the bottom of a rigid bracket 216 fixed to the cross member 150. An inner race 218 of a spherical, self-aligning, radial-and-thrust bearing 220 is fixed rigidly to arbor or post 222 having a collar portion 224. The post 222 is integral with the plate 212. Outer race 230 of the bearing 220 is fixed to cylindrical sleeve 232 of crank 233 and is carried by rollers 234 of the bearing. A sealing plate 236 secured by bolts 238 to flange 240 of the sleeve 232 has frusto-conical sealing portion 242 projecting upwardly into frusto-conical groove 244 in the plate 212 to form a labyrinth seal therewith.

The sleeve 232 (FIG. 5) is rigid with plate 250, which is integral with the upper end of shaft portion 252, to form a crank therewith with a predetermined eccentricity between the sleeve 232 and the shaft portion 252. The plate 250 has a shallow upper bore 254 smaller in diameter than the outer diameter of the bearing 220, and has in its bottom an annular groove 256 forming a labyrinth seal with reduced end portion 258 of sleeve 260 having flange 262. The flange 262 is secured of capscrews 264 to the upper end of upper cup-shaped portion 266 of bearing housing 268, and boss portion 270 of the sleeve 260 fits into counterbore 272 in the cup-shaped portion 266. The housing 268 carries aligned radial-and thrust bearings 276 and 278 journaling the upper and lower ends of the shaft portion 252, and is bolted by capscrews 282 to mounting plate 280 integral with the cross member 189 (FIG. 3) of the rigid frame of the lower screen 16.

A collar portion 290 (FIG. 5) of the shaft portion 252 is supported by the upper end of inner race 292 of the bearing 276, the inner race fitting on cylindrical portion 294 of the shaft portion. The inner race 292, in turn, is supported by tapered rollers 296 which are supported by outer race 298. The outer race is seated in and is supported by the bottom end of the counterbore 272. A sealing plate 300 seated in counterbore 302 in the housing 268 has outer and inner annular grooves 304 and 306. The grooves 304 and 306 carry O-rings 308 and 310 which bear respectively against the cylindrical wall of the counterbore 302 and sealing ring 312 supported by springs 314 carried by inner annular flange 316 of the plate 300.

The lower bearing 278 (FIG. 5) limits upward movement of the shaft portion 252 of the crank 233, and has an outer race 320 seated against the upper end of the counterbore 322 in lower, cup-shaped portion 323 of the housing 268. The bearing 278 also has tapered rollers 324 and inner race 326. The inner race 326 fits closely and slidably on cylindrical portion 328 of the shaft portion 252, and is held against downward movement relative to the shaft portion 252 by washers 330 and nut 332 screwed onto threaded portion 334 of the shaft portion and locked in position thereon by locking washer 336. A plate 338 secured to the portion 323 by capscrews 339 carries a seal 340 fitting on hardened ring 342 fitted tightly on reduced portion 344 of the shaft portion 252.

A flanged hub 350 (FIG. 5) is secured rigidly to a reduced lower end portion 352 of the shaft portion 252. The portion 352 is aligned with the concentric shaft portion 252. The hub 350 is keyed to the portion 352 by key 354 which is engaged by set screw 356. A disc portion 358 of pulley 360, also having grooved peripheral portion 362, is secured adjustably and eccentrically to the hub 350 by nuts 364 and bolts 366 projecting through slots 368 in the plate portion 358 and bores 370 in the hub. An adjustment screw 372 carried by nut 374 welded to the disc portion 358 is provided for moving the pulley 360 to its desired position of eccentricity relative to the crank 233 when the nuts 364 are loosened. Belts 378 (FIG. 3) driven by a pulley 380 of an electric motor 382 drive the pulley 360 and the crank. The motor 382 is mounted on a bracket 384 fixed to one of the posts 58. A post or arbor 386 is fixed rigidly to the center of the disc portion 358 of the pulley 360 and mounts radial-and-thrust bearing 388 by means of snap ring 390. A heavy, counterbored, ring 392 is held on the outer race of the bearing 388 by snap ring 394, and has annular, peripheral groove 396. A resilient strand 398 secured to the ring 392 and to a connecting portion 400 mounted on the base frame 12 extends oppositely to the belts 378 and urges the pulley 360 against movement to the left, as viewed in FIG. 3, to tension the belts 378.

In the operation of the rotary screening device 10, wood chips or other material to be screened is placed in the surge tank 20 (FIG. 1), and the motors 61 and 382 are energized. The motor 61 drives the conveyor screws 22 and 24 (FIG. 3) to move the wood chips to the right, as viewed in FIG. 1, to discharge the chips at a predetermined, uniform rate of flow through the openings 106 to the receiving portion 30 of the upper screen 14, and the screens 14 and 16 screen the chips and discharge them as "overs," "fines" and acceptable chips from the lower, lefthand ends of the screens. In the screening itself, the upper ends of the screens 14 and 16 are rotated or revolved relative to the base frame 12 by the crank mechanism 210, and the lower ends of the screens twist and reciprocate longitudinally, the lower ends of the screens being restrained against horizontal, transverse movement by the wide straps 130 and 154. This agitates the wood chips and causes them to spread over and slide down the screening beds 34 and 36. The motor 382 rotates the pulley 360 and the shaft portion 252 (FIG. 5) at a medium rate of speed such that the pulley 360 rotates on its own center which is coincident with the center of the arbor 386, a speed of 300 r.p.m. being ideal for many applications. The shaft portion 252 is eccentric to one side of the arbor 386 and the arbor 222 is eccentric on the directly opposite side of the arbor 386, these eccentricities being of such magnitudes that the inertias of the screens 14 and 16 balance each other. The arbor 222 of the crank mechanism 210 is revolved around the arbor 386 and the shaft portion 252 of the crank also is revolved around the arbor 386 but 180° out of phase relative to the arbor 222. The inertias of the screens 14 and 16, by weighing if necessary, are so proportioned as to balance each other, and vibrations from the movements imparted to the screens are substantially completely isolated from the base frame by mounting the crank mechanism 210 completely on the upper ends of the screens and supporting the upper ends of the screens by the flexible cables 180 for free floating movement relative to the base frame. Since the center of the combined inertias of the rotated or revolved screens is the axis of arbor 386 which is the center of the pulley 360, substantially no vibrations are transmitted through the belts 378 and strand 398 to the base frame 12.

The above-described rotary screen 10 effectively segregates and grades material supplied thereto at a constant rate of flow, and substantially no vibrations are transmitted to the base frame and the surface supporting the base frame. The drive mechanism 18 is simple, has a minimum number of parts and is rugged and troublefree.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In combination,
a first conveyor member,
a second conveyor member vertically spaced from the first conveyor member,
means mounting the conveyor members for individual floating movement,
a vertically extending crank member having a first portion and a second portion eccentric to the first portion,
first journaling means radially coupling the first portion of the crank member to one end portion of the first conveyor member and constituting the sole support of the crank member in thrust,
second journaling means radially coupling the second portion of the crank member to the second conveyor member and supporting the second conveyor member in thrust,
and means for rotating the crank member to drive the conveyor members to impart rotary translatory motion to the two members in opposed relationship.

2. In combination,
a first screen member,
a second screen member,
means mounting the screen members in superposed relationship for individual floating movement,
a vertically extending crank member having a first portion and a second portion eccentric to the first portion,
first journaling means radially coupling the first portion of the crank member to one end portion of the first screen member,
second journaling means coupling the second portion of the crank member to the second screen member,
the journaling means constituting the sole support of the crank member in thrust,
and means for rotating the crank member to drive the screen members to impart rotary translatory motion to the two members in opposed relationship.

3. In combination,
a vertically extending crank member having a first portion, a second portion eccentric to the first portion and a third portion eccentric to the first and second portions,
a floating first conveyor member journaling the first portion of the crank member at one end of said conveyor member,
a floating second conveyor member vertically spaced from the first conveyor member and journaling the second portion of the crank member,
the crank member being coupled radially to and supported against thrust solely by the conveyor members,
and drive means coupled to the third portion of the crank member for rotating the crank member to impart rotary translatory motion to the two members in opposed relationship.

4. In combination,
a vertically disposed crank member having a first portion, a second portion eccentric to the first portion and a third portion eccentric to the first and second portions,
a floating first screen member journaling and supporting the first portion of the crank member at one end of said screen member,
the first screen member constituting the sole support in thrust of the crank member,
a floating second screen member journaling and supported by the second portion of the crank member,
and drive means coupled to the third portion of the crank member for rotating the crank member, to impart rotary translatory motion to the two screen members in opposed relationship,
the masses of the screen members and the eccentricities of the first and second portions of the crank member serving to cause the third portion of the crank member to be substantially centric when the crank member is rotated.

5. In combination,
a frame,
a first screen mounted floatingly on the frame,
a second screen mounted floatingly on the frame in a position below and generally parallel to the first screen,
a vertically disposed crank having a drive portion, a first eccentric portion eccentric in one direction relative to the drive portion and a second eccentric portion eccentric in the opposite direction relative to the drive portion,
means on the first screen journaling and supporting the first eccentric at one end of said screen portion of the crank and constituting the sole support in thrust of the crank,
means on the second screen journaling and supported by the second eccentric portion of the crank,
and drive means coupled to the drive portion of the crank for rotating the crank to produce rotary translatory motion to the two screens in opposed relationship.

6. In combination,
a frame,
a first screen mounted floatingly on the frame,
a second screen mounted floatingly on the frame in a position below and generally parallel to the first screen,
a crank having a drive portion, a first eccentric portion eccentric in one direction relative to the drive portion and a second eccentric portion eccentric in the opposite direction relative to the drive portion,
means on the first screen journaling and supporting the first eccentric portion of the crank at one end portion of the screen,
means on the second screen journaling and supported by the second eccentric portion of the crank,
a pulley,
means mounting the pulley adjustably on the drive portion of the crank,
a motor mounted on the frame, and belt means coupling the motor to the pulley.

7. In combination,
a frame,
an inclined first screen mounted floatingly on the frame for substantially pivotal movement about a vertical axis at the lower end thereof,
an inclined second screen mounted floatingly on the frame in a position below and generally parallel to the first screen for substantially pivotal movement about said axis at the lower end thereof,
a crank having a drive portion, a first eccentric portion eccentric in one direction relative to the drive portion and a second eccentric portion eccentric in the opposite direction relative to the drive portion,
means on the first screen journaling and supporting the first eccentric portion of the crank at one end portion of the screen,
means on the second screen journaling and supported by the second eccentric portion of the crank,
a pulley,
means mounting the pulley adjustably on the drive portion of the crank,
a motor mounted on the frame,
and belt means coupling the motor to the pulley.

8. In combination,
a first screen including a first frame,
an arbor having a base detachably secured to the first frame at one end thereof,
a radial-and-thrust bearing having an inner race fixed to the arbor and also having an outer race,
a crank having a drive portion at one end and an eccentric portion eccentric to the drive portion and also having a first bracket at the other end so connected to the outer race as to couple the bearing eccentrically to the drive portion of the crank,
a pair of radial-and-thrust bearings mounted on the eccentric portion of the crank,
a second screen including a second frame,
a second bracket secured to the second frame and having a sleeve portion secured to the pair of radial-and-thrust bearings,
a first pulley,
means mounting the first pulley adjustably on the drive portion of the crank,
a second arbor mounted centrically on the first pulley,
a fourth radial-and-thrust bearing mounted on the second arbor,
a second pulley carried by the fourth radial-and-thrust bearing,
a mounting frame,
means mounting the screens floatingly on the mounting frame,
means coupling the mounting frame and the second pulley,
motor means mounted on the mounting frame,
and belt means coupling the motor means to the first pulley to rotate the crank whereby rotary translatory motion in opposed relationship is imparted to the two screens.

9. In combination,
an elongated, inclined top screen having an upper end and a lower end,
an elongated, inclined bottom screen having an upper end and a lower end,
a base frame,
resilient strap means supporting from the base frame the lower ends of the screens for individual longitudinal and twisting movement of the screens relative to the base frame and each other and restraining lateral movement of the lower ends of the screens,
a rotary crank having spaced therealong a first portion, a second portion eccentric to the first portion and a third portion eccentric to the first and second portions,
flexible strand means supporting the upper end of one of the screens from the base frame for universal movement of the last mentioned screen relative to the base frame,
first bearing means carried by the top screen and journaling and supporting the first portion of the crank at one end of said top screen,
second bearing means carried by the bottom screen and journaling the second portion of the crank,
and means coupled to the third portion of the crank for rotating the crank whereby rotary translatory motion in opposed relationship is imparted to the top and bottom screens.

10. In combination,
an elongated, inclined top screen having an upper end and a lower end,
an elongated, inclined bottom screen having an upper end and a lower end,
a base frame,
resilient strap means supporting from the base frame the lower ends of the screens for individual longitudinal and twisting movement of the screens relative to the base frame and each other and restraining lateral movement of the lower ends of the screens,
a rotary crank having spaced therealong a first portion, a second portion eccentric to the first portion and a third portion eccentric to the first and second portions,
flexible strand means supporting the upper end of one of the screens from the base frame for universal movement of the last mentioned screen relative to the base frame,
first bearing means carried by said one of the screens and journaling and supporting the first portion of the crank at one end of said one of the screens,
second bearing means carried by the other screen and journaling and supported by the second portion of the crank,
a pulley,
means mounting the pulley on the third portion of the crank for radial adjustment relative thereto,
a motor mounted on the base frame,
and belt means drivingly connecting the motor to the pulley.

11. In combination,
a base frame,
first and second elongated screens,
a first group of resilient straps lying in a single plane suspending from the frame one end of the first screen,
a second group of resilient straps lying in a single plane suspending from the frame one end of the second screen in a position above said one end of the first screen,
a plurality of flexible strands suspending from the frame the other end of the first screen,
an eccentric drive means connected to and supported by the other end of the first screen supporting the other end of the second screen and revolving said other ends of the screens relative to each other and the frame.

12. In combination,
a base frame,
upper and lower elongated screens,
a first group of resilient straps lying in a single plane suspending from the frame the lower end of the upper screen,
a second group of resilient straps lying in a single plane suspending from the frame the lower end of the lower screen in a position below the lower end of the upper screen,
a plurality of flexible strands suspending from the frame the upper end of the lower screen,
and eccentric drive means connected to the upper end of the upper screen and the upper end of the lower screen for supporting the upper end of the upper screen and supported by the upper end of the lower screen and revolving the upper ends of the screens relative to each other and the frame.

References Cited

UNITED STATES PATENTS

| | | | |
|---|---|---|---|
| 72,696 | 12/1867 | Swift | 209—332 |
| 390,913 | 10/1888 | Simon | 209—366 |
| 551,772 | 12/1895 | King | 209—244 X |
| 1,202,376 | 10/1916 | Fraser | 209—245 X |
| 1,479,904 | 1/1924 | Falker | 209—332 |
| 1,534,892 | 4/1925 | Beaumont | 209—315 X |
| 2,496,019 | 1/1950 | Peel | 198—64 X |
| 2,756,973 | 7/1956 | Dostatni | 74—86 X |
| 2,950,819 | 8/1960 | Holman | 209—326 |
| 3,087,617 | 4/1963 | Forsberg | 209—414 X |

FOREIGN PATENTS 522,265    12/1928    Germany.

HARRY B. THORNTON, *Primary Examiner.*

R. HALPER, *Assistant Examiner.*